United States Patent

Emelyanov et al.

[11] 4,020,410
[45] Apr. 26, 1977

[54] RECTIFIER-INVERTER SYSTEM OF CONVERTER SUBSTATION

[76] Inventors: Viktor Ivanovich Emelyanov, prospekt Engelsa, 40, kv. 40; Khaim Shlemovich Grois, Lesnoi prospekt, 15, kv. 38; Dmitry Evgenievich Kadomsky, prospekt Nauki, 6/1, kv. 58, all of Leningrad, U.S.S.R.

[22] Filed: Nov. 25, 1975

[21] Appl. No.: 635,037

[52] U.S. Cl. .............................. 321/11; 321/27 R; 361/43
[51] Int. Cl.² ........................................ H02M 1/18
[58] Field of Search ....... 307/252 L, 252 P, 252 Q; 317/17; 321/11, 12, 27 R

[56] References Cited
UNITED STATES PATENTS

| | | | |
|---|---|---|---|
| 1,983,085 | 12/1934 | Jonas | 317/17 X |
| 2,246,926 | 6/1941 | Roman | 317/17 X |
| 3,386,003 | 5/1968 | Partridge | 317/17 |
| 3,448,286 | 6/1969 | Stackegard | 321/27 X |
| 3,502,910 | 3/1970 | Johanson-Brown | 321/27 X |
| 3,536,930 | 10/1970 | Stackegard | 321/27 X |
| 3,947,726 | 3/1976 | DeCecco et al. | 321/11 |

Primary Examiner—William M. Shoop
Attorney, Agent, or Firm—Fleit & Jacobson

[57] ABSTRACT

Disclosure is made of a rectifier-inverter system of a converter substation intended for the transmission of energy between a.c. networks having different frequencies, which system comprises one or more pairs of rectifier and inverter converters connected to a common d.c. circuit.

According to the invention, the poles of at least one rectifier or inverted converter are connected to a protective grounding via resistor-capacitor elements.

The absence of direct contact with the ground in the d.c. circuit rules out the possibility of a low-resistance closed circuit being formed as a result of a short-circuit earthing at any point of the d.c. circuit. This reduces the voltage across the insulation with respect to the ground at each pole of all the converters and diminishes the steady voltage component across the insulation with respect to the ground of transformer valve windings.

1 Claim, 7 Drawing Figures

RECTIFIER-INVERTER SYSTEM OF CONVERTER SUBSTATION

The present invention relates to the transmission of energy between a.c. networks having different frequencies and, more specifically, to rectifier-inverter systems of converter substations.

The raising of power-transmitting capacity of power-transmitting systems necessitates large-scale energy transmission between asynchronously operating a.c. networks having different frequencies, which helps solve the problems of stability of combined power systems, reduces short-circuit currents and facilitates exchange of electric energy between power systems operating at different frequencies. The commonest method of transmitting energy between networks operating at different frequencies in the use of converter substations comprising one or more rectifier-inverter systems. Each rectifier-inverter system comprises one or more pairs of rectifier and inverter converters connected in series to a common d.c. circuit, so that rectifier and inverter converters alternate.

There are known converter substations comprising one or more rectifier-inverter systems for this purpose, for example, the Sakuma substation of Japan (cf. Direct Current, vol. 7, No. 2, February 1962) or the Al River substation of Canada.

In these converter substations each rectifier-inverter unit has direct connection to the ground of one of the points of the d.c. circuit.

The foregoing manner of grounding the d.c. circuit in a rectifier-inverter system has the following disadvantages:

in case of a failure accompanied by grounding some element in the d.c. circuit (for example, because of a breakdown or insulation flashover), the result is a short circuit with overcurrents flowing through the transformers and one or several valves;

in normal operating conditions, complete rectified voltage is applied to the insulation with respect to the ground of the equipment of the rectifier-inverter system, whereas a substantial portion of the rectified voltage is applied to the insulation with respect to the ground of the transformer valve windings;

due to the absence of symmetry in the circuit, the valves of the anode and cathode groups of each rectifier or inverted converter are in different conditions both as regards the voltage with respect to the ground and the characteristics of the oscillatory processes resulting from their being driven into and out of conduction.

The foregoing features typical of circuits with direct grounding in the d.c. circuit are of particular significance in the cases when semiconductor valves are employed, as the necessity of selecting the characteristics of such valves, with taking into consideration great breakdown currents and the factors involved in such valves being driven into and out of conduction, accounts for the complexity of their design, which, in turn, accounts for high costs of the valves and the substation as a whole.

It is an object of the present invention to eliminate the above-mentioned disadvantages of the conventional rectifier-inverter systems by doing away with overcurrents resulting from short-circuit grounding of the d.c. circuit.

It is another object of the present invention to reduce voltages applied to the insulation with respect to the ground of the units connected to the d.c. circuit of the system.

The foregoing objects are attained by providing a rectifier-inverter system of a converter substation for transmitting energy between a.c. networks having different frequencies, which system comprises one or more pairs of rectifier and inverter converters connected in series to a common d.c. circuit so that the rectifier and inverter converters alternate, said system being characterized in that the poles of at least one rectifier or inverted converter are connected to a protective grounding via resistor-capacitor elements.

The connection of elements of the d.c. circuit of the rectifier-inverter system to the protective grounding via resistor-capacitor elements turns the d.c. circuit into a system without any direct contact with the ground.

The absence of direct contact with the ground in the d.c. circuit rules out the possibility of a low-resistance circuit being formed in cases of short-circuit grounding at any point of the d.c. circuit.

The connection circuitries of the resistor-capacitor elements are selected so as to provide high resistance for short-circuit currents in cases of short-circuit grounding at any point of the d.c. circuit. For a broad frequency range, the parameters of the resistor-capacitor elements are selected so as to ensure voltage with respect to the ground at the poles of each converter, which voltage would be equal in magnitude, but different in sign. This reduces two-fold the voltage across the insulation with respect to the ground for each pole of all the converters (as compared to conventional systems) and rules out (or reduces) the steady voltage component across the insulation with respect to the ground of transformer valve windings.

If voltage is distributed only within the low-frequency range and for the steady component, the connection of converter poles to a protective grounding by means of resistor-capacitor elements may be effected in the case of at least one rectifier or inverted converter placed in the common d.c. circuit.

Other objects and advantages of the present invention will become more apparent from the following detailed description of an embodiment of a rectifier-inverter system of a converter substation intended for transmitting energy between a.c. networks having different frequencies, with reference to the accompanying drawings, wherein.

Figure 1:
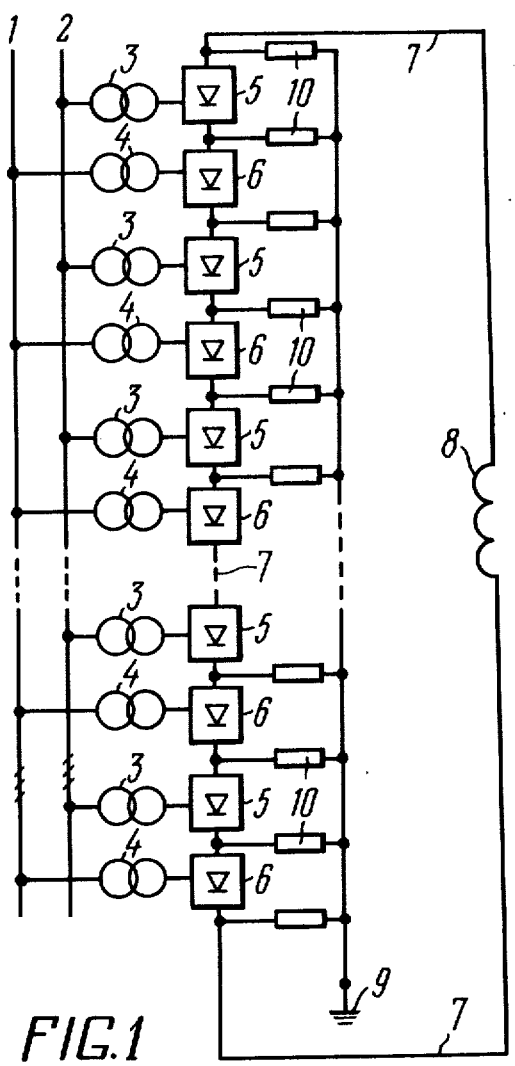
FIG. 1 is a key diagram of a rectifier-inverter system of a converter substation in accordance with the invention.

To better understand the invention, consider now a converter substation having buses 1 and 2 (FIG. 1) of a.c. networks operating at different frequencies. Connected via power transformers 3 and 4 to the buses 1 and 2 are rectifier converters 5 and inverted converters 6. The function of the rectifier converters 5 and the inverted converters 6 may be performed by any cnverter valve circuit (for example, six- or twelve-phase bridge circuits). Each transformer 3 and 4 may be assembled from one or several units. The rectifier converters 5 and the inverted converters 6 are connected in series to a d.c. circuit 7 includng an equivalent current-limiting inductor 8 which may be constructed in the form of one or several reactors.

The d.c. circuit 7 of the rectifier-inverter system of FIG. 1 may include only a whole number (one or more) of seriesly connected pairs of rectifier converters 5 and inverted converters 6.

According to the invention, the poles of the rectifier converters 5 and the inverted converters 6 are connected to a protective grounding 9 via resistor-capacitor elements 10.

The resistor-capacitor elements 10 provide great resistance for short-circuit current to the ground at any point of the d.c. circuit and are selected for a broad frequency range so as to ensure voltage with respect to the ground across the poles of each converter 5 and 6, which voltage must be equal in magnitude in different in sign. This reduces two-fold the voltage across the insulation with respect to the ground of each pole of the rectifier converters 5 and the inverted converters 6 (as compared to conventional systems) and rules out completely or reduces the steady voltage component across the insulation with respect to the ground of the valve windings of the transformers 3 and 4.

If voltage is distributed only within the low frequency range and for the steady component, the elements 10 may be connected to at least one converter 5 or 6.

Figure 2:
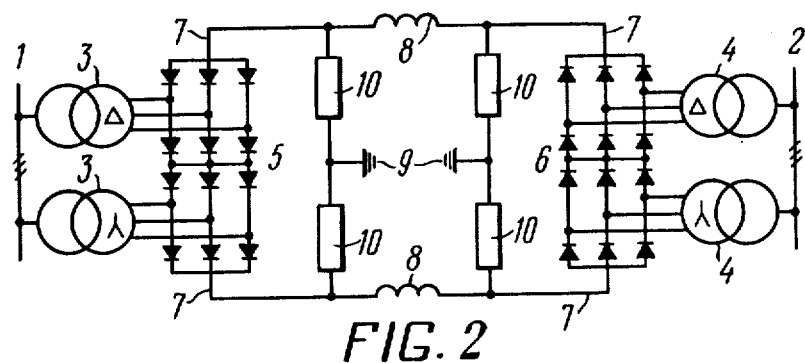
FIG. 2 shows a rectifier-inverter system in accordance with the invention, comprising one pair of twelve-phase converters.

FIG. 2 shows, by way of an example, a rectifier-inverter system comprising one pair of converters (a rectifier converter 5 and an inverted converter 6), each of the converters 5 and 6 being a twelve-phase converter.

In principle, it is sufficient to connect the elements 10 to the poles of one converter (5 or 6) in this circuit. It is preferable, however, to have four resistor-capacitor elements 10 connected to the circuit of FIG. 2, because in this case the voltage assymetry resulting from a breakdown of one of the resistor-capacitor elements 10 is less dangerous for the equipment and may be eliminated by disconnecting one of the resistor-capacitor elements 10 of the second pole.

Figures 3, 4, 5, 6, 7:
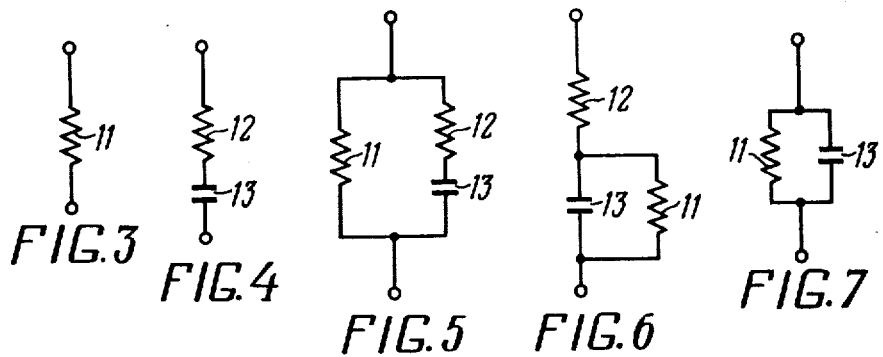
FIGS. 3, 4, 5, 6 and 7 show preferred connection diagrams of resistor-capacitor elements.

There may be different modifications of the circuitries of the resistor-capacitor elements 10. FIG. 3 shows, for example, an element 10 being constructed in the form of a resistor 11; FIG. 4 shows an element 10 constructed as a circuit including a resistor 12 and a capacitor 13; FIG. 5 and FIG. 6 show different ways of jointly connecting the resistors 11 and 12 and the capacitor 13 in an element 10.

The resistance of the resistors 11 is selected so that the determining factor be the currents through the resistors, irrespective of possible variations in the values of leakage currents through the insulation of different poles, which ensures preselected constant voltage distribution across the poles with respect to the ground in steady-state conditions.

The function of the resistor 11 may be performed by both linear and non-linear elements, for example, varistors or semi-conductor instruments with controlled avalanching (stabilovolts).

If the element 10 is a circuit including resistors and capacitors, the capacitances of the capacitors 13 are selected so that they are greater than the instrinsic capacitance of the entire circuit. In this case low-frequency transient voltage components (those appearing between the poles in the course of low-frequency oscillatory processes resulting from breakdown commutations or disturbances in the normal commutation of the bridge valves) are symmetrical with respect to the ground. The resistance of the resistors 12 is selected so as to damp high-frequency oscilatory processes in the circuits including equivalent pole-pole and pole-ground capacitors. Considerable differences in the resistance of the resistors 11 and 12 (the resistance of the resistor 11 is great, as compared to that of the resistor 12) makes it possible to use the circuit diagrams of FIGS. 5 and 6 to construct an element 10. In some cases it is preferable to use the modification of FIG. 7 (the latter is preferable for systems with low rectified voltage).

The present invention makes it possible to substantially mitigate the requirements imposed upon the equipment of a converter substation and thus reduce the latter's cost. This is due to the following:

the invention rules out the appearance of great breakdown currents through the equipment (valves, power transformers, etc.) due to a flashover or an insulation breakdown with respect to the ground on the side of direct current;

the invention rules out a steady voltage component applied to the valve windings of conversion transformers);

the invention reduces two-fold the maximum voltages acting upon the major insulation of the conversion equipment in normal conditions and in the course of transient processes.

Due to the fact that in the proposed rectifier-inverter system short-circuit grounding at any point of the d.c. circuit does not result in the passage of breakdown current and does not disturb the operation of the bridges, it is possible to substantially simplify the system for protecting the equipment from overvoltages and to use dischargers without current-limiting resistors or special current-limiting devices.

The proposed converter substation circuitry is especially effective for rectifier-inverter systems employing semiconductor valves. It is of utmost importance for such valves that in the proposed circuitry, which is provided with means for the protection from single-pole short-circuiting to the ground, the probability of the appearance of short-circuit overcurrents (simultaneous short-circuiting to the ground of both poles of a converter) is so small that it may be ignored. The reduction in voltages acting upon the insulation elements of the valves facilitates the problem of controlling the valves from the ground potential. The elimination of a direct discharge of the capacitors connected to the valve windings of the transformers to the ground reduces the amplitude of the discharge currents as the valves are driven into conduction; the symmetry of the oscillation circuits ensures identical characteristics of voltage restored across the valves. All the foregoing factors make less stringent the requirements imposed upon the valves, which makes it possible to simplify their design and reduce their production costs.

What is claimed is:

1. A rectifier-inverter system of a converter substation for transmitting energy between a.c. networks operating at different frequencies, comprising one or more pairs of rectifier and inverter converters connected in series to a common d.c. circuit so that said rectifier and inverter converters integrate, the poles of at least one rectifier or inverted converter being connected to a protective grounding via resistor-capacitor elements.

* * * * *